United States Patent
Lecerf et al.

(10) Patent No.: US 9,187,170 B2
(45) Date of Patent: Nov. 17, 2015

(54) AIRCRAFT AIRFOIL, AND AN AIRCRAFT PROVIDED WITH SUCH AN AIRFOIL

(71) Applicant: AIRBUS HELICOPTERS, Marignane, Cedex (FR)

(72) Inventors: Luc Lecerf, Aix en Provence (FR); Vincent Moreau, Marseilles (FR); Xavier Maraninchi, Marseilles (FR); Jean-Charles Sicard, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 137 days.

(21) Appl. No.: 13/840,512

(22) Filed: Mar. 15, 2013

(65) Prior Publication Data
US 2013/0277499 A1    Oct. 24, 2013

(30) Foreign Application Priority Data
Apr. 19, 2012    (FR) ...................................... 12 01151

(51) Int. Cl.
| | | |
|---|---|---|
| *B64C 3/18* | (2006.01) | |
| *B64C 3/28* | (2006.01) | |
| *B64C 5/02* | (2006.01) | |
| B64D 45/00 | (2006.01) | |
| B64C 27/04 | (2006.01) | |

(52) U.S. Cl.
CPC . *B64C 3/185* (2013.01); *B64C 3/28* (2013.01); *B64C 5/02* (2013.01); *B64C 27/04* (2013.01); *B64D 2045/0095* (2013.01)

(58) Field of Classification Search
CPC ............ B64C 3/185; B64C 3/28; B64C 5/02; B64C 27/04; B64D 2045/0095
USPC ................. 244/123.1; 137/15.1; 415/151.208
See application file for complete search history.

(56) References Cited

U.S. PATENT DOCUMENTS

| | | | |
|---|---|---|---|
| 2,390,761 | A | 12/1945 | Watter |
| 7,931,233 | B2 | 4/2011 | Arafat |
| 8,123,167 | B2 | 2/2012 | Olmi et al. |
| 8,419,815 | B1 * | 4/2013 | Moran .............................. 55/306 |

(Continued)

FOREIGN PATENT DOCUMENTS

| | | |
|---|---|---|
| CN | 101389471 A | 3/2009 |
| CN | 100532196 A | 8/2009 |

(Continued)

OTHER PUBLICATIONS

"Wing Leading Edge Design with Composites to Meet Bird Strike Requirements" Composites Manufacturing, Butterworth Scientific, Guildford, Surrey, GB, Jan. 1, 1991, pp. 3-18, XP008022816, ISSN: 0956-7143.

(Continued)

*Primary Examiner* — Valentina Xavier
(74) *Attorney, Agent, or Firm* — Brooks Kushman P.C.

(57) ABSTRACT

An airfoil (10) having a main structure (15) including at least one spar (16) and a front structure (20) forming a leading edge (21), said airfoil (10) having an empty space (25) between said main structure (15) and said front structure (20). The airfoil (10) includes a rigid deflector member (30) in said empty space (25), the deflector member being fastened to the main structure (15), said deflector member (30) having a sharp edge (31) facing towards said front structure (20) in order to deflect an external obstacle impacting against said front structure (20).

19 Claims, 2 Drawing Sheets

(56) References Cited

U.S. PATENT DOCUMENTS

| | | |
|---|---|---|
| 8,746,619 B2 | 6/2014 | Li et al. |
| 2007/0029443 A1 | 2/2007 | Manz |
| 2007/0059169 A1* | 3/2007 | Barnett et al. ............. 415/208.1 |
| 2007/0138340 A1 | 6/2007 | Arafat |
| 2009/0127392 A1 | 5/2009 | Gross et al. |
| 2009/0277996 A1 | 11/2009 | Rinaldi |
| 2010/0148007 A1 | 6/2010 | Manz |
| 2013/0082142 A1* | 4/2013 | Li et al. ....................... 244/123.1 |
| 2013/0294894 A1* | 11/2013 | Kline ............................ 415/151 |
| 2014/0352795 A1* | 12/2014 | Kline ........................... 137/15.1 |

FOREIGN PATENT DOCUMENTS

| | | |
|---|---|---|
| CN | 101786499 A | 7/2010 |
| CN | 102390520 A | 3/2012 |
| DE | 102005060958 A1 | 6/2007 |
| EP | 2130762 A2 | 12/2009 |
| EP | 2196391 A2 | 6/2010 |

OTHER PUBLICATIONS

Search Report and Written Opinion; Application No. FR 1201151; dated Nov. 22, 2012.

Chinese First Office Action CN201310117821.9; dated Dec. 31, 2014; 15 pages.

* cited by examiner

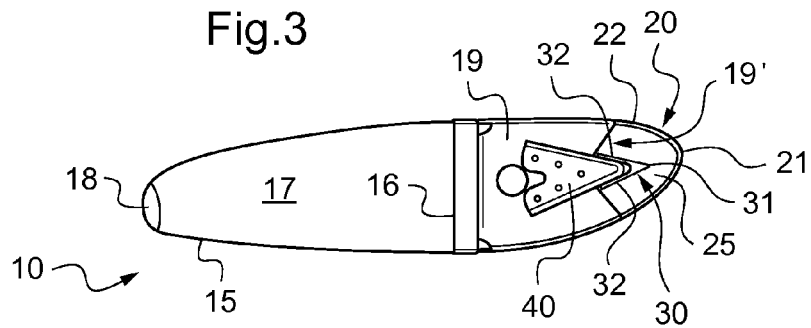
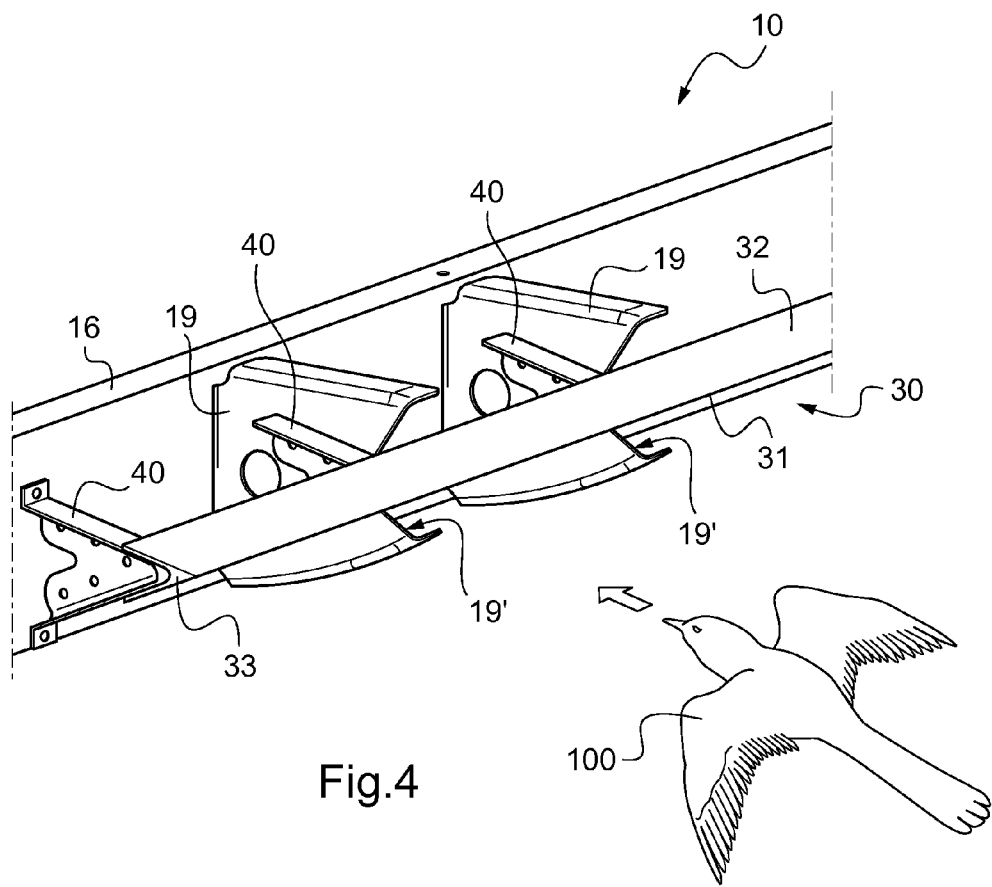

AIRCRAFT AIRFOIL, AND AN AIRCRAFT PROVIDED WITH SUCH AN AIRFOIL

CROSS REFERENCE TO RELATED APPLICATIONS

The present application claims priority to French patent application FR 12 01151 filed on Apr. 19, 2012, the content of which is incorporated in its entirety by reference herein.

BACKGROUND OF THE INVENTION (1) Field of the Invention

The present invention relates to an aircraft airfoil, and to an aircraft having such an airfoil. More particularly, the invention relates to a stabilizer, and in particular to a stabilizer for an aircraft having a rotary wing.

(2) Description of Related Art

A stabilizer is a stationary airfoil that is generally located at the rear of an aircraft fuselage. Under such circumstances, a stabilizer is specifically designed to develop forces suitable for stabilizing and/or controlling pitching movements of the aircraft, and possibly also movements in yaw of the aircraft.

A stabilizer may comprise a set of substantially horizontal airfoils and of substantially vertical airfoils.

The substantially horizontal airfoils serve in particular to optimize the stability of the pitching movement of the aircraft. Such substantially horizontal airfoils are conventionally referred to as a "tail plane" or a "horizontal tail". It should be observed that a horizontal stabilizer may include a movable portion referred to as an "elevator".

A horizontal stabilizer may pass through an aircraft fuselage and extend on either side of the fuselage, or indeed it may extend from only one side of the fuselage. A horizontal stabilizer extending on either side of a fuselage may comprise a single airfoil passing through the fuselage or two airfoils extending from the fuselage in two respective opposite directions.

Independently of the way the horizontal stabilizer is made, the horizontal stabilizer includes a system for fastening it to the fuselage.

Substantially vertical airfoils serve in particular to optimize the stability of the roll movement of the aircraft. Such substantially vertical airfoils are conventionally referred to as a "tail fin". A tail fin may include a movable portion referred to as a "rudder".

Thus, an aircraft conventionally has an airfoil provided with a system for passing it to a fuselage, such as a stabilizer.

Furthermore, such a member of an aircraft that projects from the fuselage runs the risk of being impacted in flight by an obstacle, such as a bird. A stabilizer may be the subject of a risk of bird impact when the stabilizer projects by a non-negligible amount outwards from the aircraft.

Damage to a stabilizer as a result of a bird impact can have an influence on safety in flight, so manufacturers tend to optimize stabilizers against impacts of this kind.

More particularly, a bird impact runs the risk of breaking the fastener system connecting an airfoil to an aircraft fuselage, since an impact against a bird generates excessive forces on the fastener system.

Conventionally, an airfoil comprises a main structure around a spar. The airfoil is also provided at its leading edge with a protective front structure.

The terms "main structure" and "front structure" are used below for convenience and for reasons of clarity.

For example, the front structure is fastened to a spar of the airfoil by ribs.

Under such circumstances, when a bird impacts the front structure, the front structure deforms without stopping the bird. The bird penetrates into the inside of the stabilizer and then impacts against the spar of the airfoil.

By definition the spar is very strong. The spar therefore does not deform under the impact. However the spar moves back and pivots about the fastener system for the airfoil.

The fastener system becomes deformed and, in the extreme, it may break.

In order to minimize the risks of an impact, a first device is known that is used in particular on a cover of a tail gearbox of the helicopter known under the trademark EC175®.

That first device makes use of a blade fastened to the outside of the front structure of the cover. The blade is intended to cut through a bird, should that be necessary in order to protect the cover, and more particularly in order to protect its fastener system connecting it to the body of the aircraft.

That first device gives satisfaction. However the blade disturbs the aerodynamic flow of air around the cover.

In addition, the cover is reinforced in order to enable the blade to be fastened thereto. Since the front structure is generally dimensioned in order to withstand light external loading, the front structure needs to be modified in order to receive the blade.

The resulting stiffening of the front structure tends to give rise to a non-negligible increase in its weight.

Furthermore, fabrication of the stabilizer is made more complex.

A second device is known and described in document EP 2 196 391.

That second device consists in reinforcing the front structure of an airfoil. The reinforcement may be obtained by means of chemical machining or indeed by adding Y-shaped reinforcement. The purpose of the second device is thus to maximize the amount of energy that the front structure absorbs as a result of impacting against a bird.

That second device is also satisfactory. Nevertheless, reinforcing the front structure gives rise to a significant increase in the weight of the airfoil. In addition, the fabrication of that airfoil and more particularly of its front structure is made more complex.

The first device thus suggests modifying the front structure by adding a blade, while the second device suggests modifying the front structure by reinforcing it.

Also known is document U.S. Pat. No. 7,931,233. That document relates to a protective skin forming a leading edge.

The technological background also includes the document "Wing leading edge design with composites to meet bird design strike requirements", Composites Manufacturing, Butterworth Scientific, Guildford, Surrey, GB, Jan. 1, 1991, pp. 3-18.

The technological background also includes the following documents: U.S. Pat. No. 2,390,761; US 2010/148007; EP 2 130 762; and DE 10 2005 060958.

BRIEF SUMMARY OF THE INVENTION

An object of the present invention is thus to provide an airfoil seeking to avoid the airfoil separating from the fuselage as a result of an impact with an external body and in particular a bird. Such an airfoil may be an aircraft stabilizer, such as a horizontal or a vertical stabilizer. Any other type of airfoil may be envisaged.

According to the invention, an airfoil is provided with a main structure comprising at least one spar and a front structure forming a leading edge, the airfoil having an empty space between the main structure and said front structure. The term "empty space" designates a hollow space that is therefore suitable for receiving various members.

In the empty space, the airfoil also includes a rigid deflector member that is fastened to the main structure. The deflector member is provided with a sharp edge directed towards the front structure in order to deflect an external obstacle impacting against the front structure.

The term "sharp edge" is well known to the person skilled in the art. It designates an edge that is well marked.

Terms such as "cutting edge" or more simply "edge" can also be used.

The deflector member can deflect an external obstacle such as a bird, either by changing the path it is following or else by cutting the obstacle into at least two pieces. The term "deflect" is thus used to mean either a first action consisting in deflecting such a body as such, or else a second action consisting in cutting through a body, or indeed an action combining both of the above-mentioned first and second actions.

The invention does not seek to protect a front surface of an airfoil but rather to protect the fastening of the airfoil.

Thus, when a bird impacts against the front structure, the front structure deforms without stopping the bird. The bird penetrates into the empty space and then impacts against the deflector member of the airfoil.

The deflector member cuts or deflects the bird so that it does not impact against the spar of the main structure.

Since the deflector member is fastened to the main structure, the deflector member tends to exert a force on that main structure. The main structure pivots and exerts a force on the fastener system that fastens the airfoil to the vehicle. Nevertheless, the Applicant has observed that the forces that are exerted are smaller than they would be in the absence of the deflector member and they do not lead to the fastener system breaking. The energy absorbed by the deflector member suffices to prevent the airfoil being separated, particularly since the bird does not impact against the main structure.

Such an airfoil may thus be a horizontal stabilizer and include a fastener system for fastening it to an aircraft fuselage. For example, the airfoil may be a stabilizer provided with a fitting fastening it to a tail boom of the aircraft.

Under such conditions, the deflector member represents a blade arranged in the empty space defined in a front structure, unlike the prior art that provides a blade arranged on the outside face or the inside face of such a front structure. Thus, the deflector member has no incidence on the aerodynamic flow of air around the airfoil.

Furthermore, since the deflector member is not fastened to the front structure, installing the deflector member does not involve modifying the front structure. Under such conditions, the front structure does not need to be dimensioned so as to be capable of withstanding a bird impact, for example. Consequently, the front structure may be a simple skin that is easy to fabricate and of low weight, since it needs only to perform an aerodynamic function.

In addition, since the deflector member is fastened to the main structure, and for example to the spar, the deflector member is fastened to a part that is structurally strong.

The front structure and the deflector member are kept separate, with each of them performing a function that is specific thereto. The deflector member is not actually in contact with the front structure.

Furthermore, putting the deflector member into place makes it possible to avoid reinforcing the fastener system, while also preventing the airfoil from becoming separated.

It is therefore possible to envisage implementing the invention on existing vehicles.

The invention may also include one or more of the following additional characteristics.

For example, the deflector member may be parallel to the leading edge of the airfoil. The sharp edge may for example face and be parallel to the leading edge of the airfoil.

This arrangement maximizes the effectiveness with which a bird is cut through in the event of making contact with a bird seeking to pass through the structure.

Furthermore, the front structure may be made of metal.

A metal front structure presents the advantage of generating a limited amount of debris as the result of an impact, e.g. in comparison with a composite structure. A front structure made of composite material is very strong and contributes to absorbing energy, whereas a front structure made of metal is weak and generates little debris.

In the context of a stabilizer located upstream from a rotor, a metal front structure appears to be advantageous in order to minimize any risk of the rotor being damaged as a result of an impact against the stabilizer.

The front structure may thus comprise a metal sheet having the required shape for optimizing the aerodynamic flow of air around the airfoil.

In another aspect, the deflector member may comprise two fastener strips that intersect at the sharp edge, each strip being fastened to the main structure by at least one bracket arranged in said empty space. The deflector member is then V-shaped.

Such a deflector member is relatively simple and it is easy to fabricate.

In addition, said front structure is fastened to the main structure by at least one rib, and at least one bracket is fastened to a rib.

For example, at least one bracket may be fastened to the spar of the main structure by means of a rib, said rib being fastened to the spar.

The deflector member may then be fastened to existing elements of an airfoil.

A bracket may also be fastened directly to the spar.

Furthermore, if the front structure is fastened to the main structure by at least one rib, the rib may include an opening that is open towards the front structure and that has the deflector member passing therethrough.

This characteristic makes it easier to arrange the deflector member in the empty space.

Finally, in addition to an airfoil, the invention provides an aircraft having a fuselage. The aircraft then includes at least one airfoil of the invention that is fastened to said fuselage.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 3 is a section of an airfoil of the invention; and

FIG. 4 is a three-dimensional view showing a deflector member.

DETAILED DESCRIPTION OF THE INVENTION

Elements present in more than one of the figures are given the same references in each of them.

Figure 1:
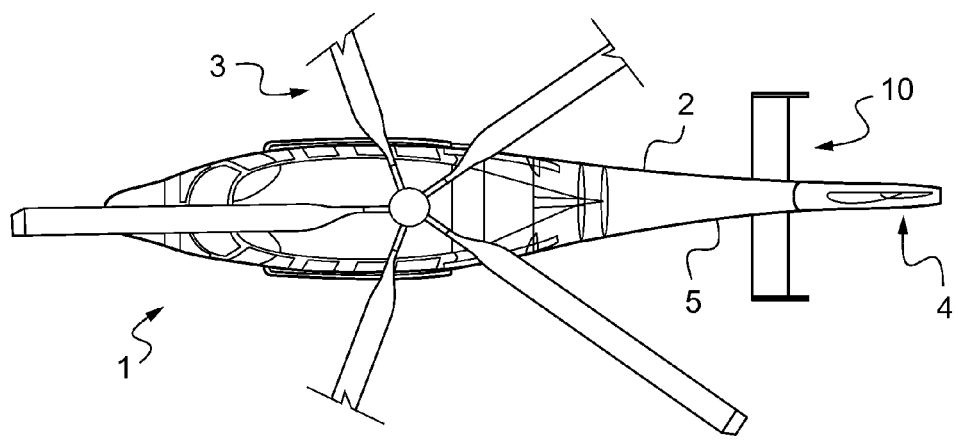
FIG. 1 is a view of an aircraft of the invention.

FIG. 1 shows an aircraft 1 having a fuselage 2.

The aircraft 1 may be a rotary wing aircraft. For example, the aircraft 1 may comprise a main rotor 3 for providing lift and propulsion, and also a tail rotor 4 for providing yaw control.

The aircraft 1 may also be a fixed wing aircraft.

Furthermore, the aircraft 1 has an airfoil 10 carried by the fuselage 2. Such an airfoil 10 may for example be a horizontal stabilizer fastened to a tail assembly 5 of the aircraft 1.

Figure 2:
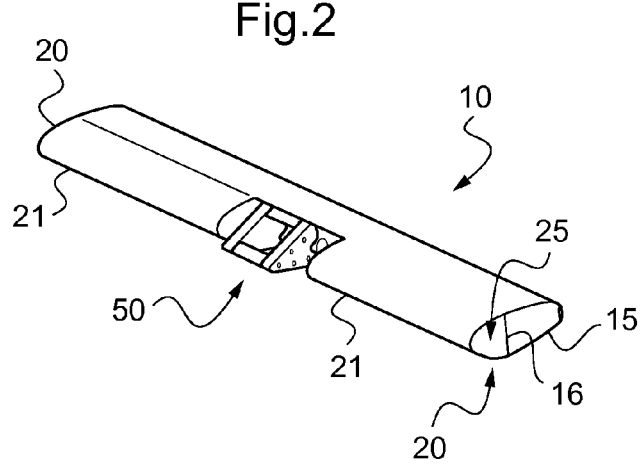
FIG. 2 is a view of an airfoil of the invention.

With reference to FIG. 2, the airfoil 10 includes a main structure 15. The main structure 15 is provided with a spar 16 secured to a fastener system 50.

The fastener system 50 thus serves to fasten the airfoil to a member of the aircraft 1, e.g. the fuselage 2.

Furthermore, the airfoil 10 has a front structure 20 defining its leading edge 21.

With reference to FIG. 3, the airfoil has an empty space 25 defined by the front structure 20 and the main structure 15.

The front structure 20 is advantageously fastened to the main structure 15 by a plurality of ribs 19 present in the empty space 25. Each rib 19 serves optionally to fasten the front structure 20 to the spar 16 of the main structure 15.

By way of example, such a front structure comprises a curved metal plate fastened by conventional means to the ribs.

It should be observed that the main structure 15 may include filler means 17 between these suction side and pressure side walls, and possibly also a ledge 18 at the trailing edge of the airfoil.

Furthermore, in accordance with the invention, the airfoil 10 has a rigid deflector member 30 that is independent and distinct from the front structure 20.

This deflector member 30 is fastened to the main structure 15 and it is arranged in the empty space 25.

The deflector member 30 extends along the span of the airfoil 10 parallel to the spar 15 and to the leading edge 21, but without ever coming into contact with the front structure 20.

The deflector member has a sharp edge 31 facing the front structure, and more particularly facing the leading edge 21. This sharp edge 31 is for deflecting an external obstacle that passes through the front structure 20, e.g. a bird, possibly while also cutting through the external obstacle.

More particularly, the deflector member may include two fastener strips 32, with the sharp edge 31 being formed where the fastener strip 32 intersects. The sharp edge 31 is advantageously tapered, or indeed a cutting-edge.

Each fastener strip 32 may then be fastened to the main structure via a bracket 40. At least one bracket 40 may then be secured by conventional means to a rib 19 in the empty space 25.

Nevertheless, and with reference to FIG. 4, a bracket 40 may be fastened directly to the main structure 15, and to the spar 16, for example.

In addition, each rib 19 shown possesses an opening 19' directed towards the front structure, each opening 19' having the deflector member passing therethrough.

Under such conditions, an external obstacle 100 impacting against the airfoil may pass locally through the front structure.

The external obstacle then reaches the deflector member 30. The deflector member absorbs some of the energy that results from the impact and deflects the obstacle outwards. For example, the deflector member may cut a bird in two.

The airfoil nevertheless runs the risk of performing a turning movement as a result of the impact. However, since the deflector member absorbs some of the energy that results from the impact with the obstacle being deflected outwards from the airfoil, this turning may damage the fastener system 50 within the acceptable limits of the dimensioning of the components.

The invention thus serves to avoid the airfoil separating from the fuselage 2 as a result of an impact with an external member.

Naturally, the present invention may be subjected to numerous variations as to its implementation. Although several embodiments have been described, it will readily be understood that it is not conceivable to identify exhaustively all possible embodiments. It is naturally possible to envisage replacing any of the means described by equivalent means without going beyond the ambit of the present invention.

What is claimed is:

1. An airfoil having a main structure including at least one spar and a front structure made of metal forming a leading edge, the airfoil having an empty space between the main structure and the front structure, wherein the airfoil includes a rigid deflector member in the empty space, the deflector member being fastened to the main structure, the deflector member having a sharp edge facing towards the front structure in order to deflect an external obstacle impacting against the front structure, the deflector member not being in contact with the front structure.

2. The airfoil according to claim 1, wherein the deflector member is parallel to the leading edge of the airfoil.

3. The airfoil according to claim 1, wherein the deflector member comprises two fastener strips intersecting at the edge, each fastener strip being fastened to the main structure by at least one bracket.

4. The airfoil according to claim 3, wherein the front structure is fastened to the main structure by at least one rib, with the at least one bracket being fastened to the at least one rib.

5. The airfoil according to claim 4, wherein the at least one rib is fastened to the spar.

6. The airfoil according to claim 4, wherein the rib includes an opening facing towards the front structure and through which the deflector member passes.

7. The airfoil according to claim 1, wherein the airfoil is a stabilizer.

8. The airfoil according to claim 1, wherein the airfoil is fastened via a fastener system to an aircraft fuselage.

9. The airfoil according to claim 1, wherein the deflector member is fastened to the spar.

10. An aircraft having a fuselage, wherein the aircraft includes at least one airfoil according to claim 1 and fastened to the fuselage.

11. The airfoil according to claim 1, where the sharp edge is in the empty space.

12. An airfoil having a main structure including at least one spar and a front structure forming a leading edge, the airfoil having an empty space between the main structure and the front structure, wherein the airfoil includes a rigid deflector member in the empty space, the deflector member being fastened to the main structure, the deflector member having a sharp edge facing towards the front structure in order to deflect an external obstacle impacting against the front structure, the deflector member not being in contact with the front structure, the front structure being fastened to the main structure by at least one rib that includes an opening facing towards the front structure and through which the deflector member passes.

13. The airfoil according to claim 12, wherein the deflector member is parallel to the leading edge of the airfoil.

14. The airfoil according to claim 12, wherein the deflector member comprises two fastener strips intersecting at the edge, each fastener strip being fastened to the main structure by at least one bracket, with the front structure being fastened to the main structure by at least one rib, with the at least one bracket being fastened to the at least one rib, and with the at least one rib being fastened to the spar.

15. The airfoil according to claim 12, wherein the front structure is made of metal.

16. The airfoil according to claim 15, wherein the front structure comprises a sheet of the metal and has a shape that optimizes the aerodynamic flow of air around the airfoil.

17. An airfoil comprising:
 a main structure having a spar;
 a metallic shell extending from the main structure, the shell defining a leading edge and having an inner surface;
 a rib coupled to the spar and the inner surface, the rib having a forward portion, the forward portion and the leading edge having a space therebetween;
 a bracket coupled to the forward portion; and
 a deflector member supported by the bracket and extending toward the leading edge, the deflector member having a sharp edge disposed in the space, wherein the sharp edge is not connected to the leading edge.

18. The airfoil of claim 17, wherein the deflector is only supported by the bracket.

19. The airfoil of claim 17, further comprising at least one additional rib coupled to the spar and at least one additional bracket coupled to the at least one additional rib, wherein the deflector is only supported by the bracket and the at least one additional bracket.

* * * * *